United States Patent [19]

Spitalny et al.

[11] 3,787,624

[45] Jan. 22, 1974

[54] REMOTE CONDITION MONITORING DEVICE

[75] Inventors: Arnold Spitalny, Dix Hills; George Brettbart, New York; Stanley R. Sporn, Oceanside, all of N.Y.

[73] Assignee: Atron Industries, Inc., Dix Hills, N.Y.

[22] Filed: May 22, 1972

[21] Appl. No.: 255,662

[52] U.S. Cl. .................. 179/2 A, 179/5 R, 340/408

[51] Int. Cl. .......................................... H04m 11/04

[58] Field of Search ............. 179/5 R, 2 A; 340/408

[56] References Cited

UNITED STATES PATENTS

| | | | |
|---|---|---|---|
| 3,612,768 | 10/1971 | Sherman | 179/5 R |
| 3,641,270 | 2/1972 | Ohshima | 179/2 A |
| 3,325,598 | 6/1967 | O'Neill | 179/2 A |
| 2,283,302 | 2/1957 | Kropp | 179/5 R |
| 1,685,853 | 10/1928 | Mazzur | 179/5 R |

*Primary Examiner*—Kathleen H. Claffy
*Assistant Examiner*—David L. Stewart
*Attorney, Agent, or Firm*—Edward F. Levy, Bernard Malina

[57] ABSTRACT

A remote condition monitoring device is operative to connect into preexisting telephone station lines when a monitored physical condition exceeds preset limits. An incoming call causes completion of the calling circuit by simulating the lifting of a receiver at the called station. A warning tone is produced which is audible to the caller over the completed telephone calling circuit.

14 Claims, 2 Drawing Figures

REMOTE CONDITION MONITORING DEVICE

Figure 1:
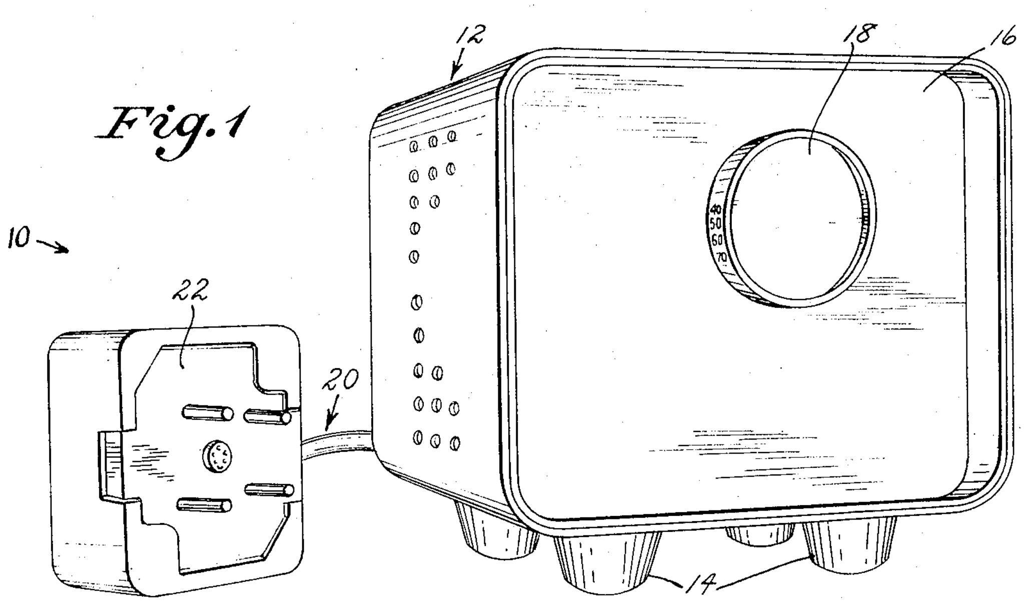

The present invention relates to remote condition monitoring devices and more particularly to remote condition monitoring devices which are particularly useful in conjunction with preexisting telephone systems.

Presently known uses of telephone lines for monitoring purposes include elaborate electronic and electromechanical devices which are operative, when certain present monitored conditions obtain, to dial a preselected telephone number and to transmit a prerecorded message. Such devices are relatively complex and expensive and require the presence of a person at the called telephone to answer the telephone to receive the pre-recorded message, a requirement which is unrealistic in many situations. Furthermore, such devices, in some instances, require a separate telephone line for transmitting such prerecorded messages, thus adding to the operating costs the additional telephone line rental charges.

There is a widespread need for an inexpensive remote condition monitoring device for monitoring certain conditions in one's home or business premises when no occupants are present, particularly when such occupants are far removed from their home or business premises. A typical condition to be monitored in such instances is the room temperature of the premises, where a large drop in room temperature would indicate failure of the heating system. Such failure in the heating system can produce serious damage to the premises such as the bursting of frozen water pipes, destruction of plant life in a greenhouse, etc.

Presently, many persons who find it necessary to be absent from their homes for extended periods of time such as for winter vacation, have their neighbors or specific individuals hired for that purpose, inspect their homes at periodic intervals. Such arrangements for monitoring the conditions of an absent resident's home are obviously inconvenient and unreliable. Alternatively, the installation of monitoring devices with local indicators such as a warning light to signal a neighbor when the heating system fails, is unreliable because it depends on the attention of individuals who may be also absent from their homes or may seldom be in a position to notice the warning indicator light.

In addition to the above-described household applications, remote condition monitoring devices are particularly useful in commercial and industrial applications for monitoring conditions such as temperature in refrigerated enclosures as well as any other conditions that can cause a sensor to close an electrical contact, and upon interrogation providing an alarm signal when the preselected condition limits have been exceeded or logical combination conditions have occurred.

Known remote condition monitoring devices which use telephone lines for interrogation of the conditions at the called station generally require the completion of the interrogatory call before ascertaining whether the monitored condition is satisfactory or unsatisfactory. Thus, where the calling party is far removed from the station to be called, a long distance telephone charge is incurred with each telephoned inquiry, making frequent interrogations rather costly. Attempts to avoid the telephone charge by using a busy signal or a phone pickup and disconnect without a signal tone are easily confused with normal telephone sounds and do not give a positive warning indication. The present system completes the call, provides a clear warning signal when warranted and reduces telephone charges by not answering when the monitored condition is satisfactory.

It is therefore an object of the present invention to provide a remote condition monitoring device which is inexpensive to manufacture and simple to operate.

Another object of the present invention is the provision of a remote condition monitoring device which is operative in conjunction with preexisting telephone lines avoiding the requirement for installation of special wiring for the monitoring system.

A further object of the present invention is the provision of a remote condition monitoring device operative in conjunction with preexisting telephone lines where upon interrogation, a satisfactory monitored condition will produce a "no answer" at the called station and the calling circuit will be completed only if the monitored condition is unsatisfactory.

In accordance with the principles of the present invention there is provided a remote condition monitoring apparatus for use in conjunction with a preexisting telephone system comprising lead means adaptable for connection to preexisting telephone station lines and monitoring means operative to determine when a preselected measurable physical parameter exceeds a predetermined limit. There is further provided means for detecting the presence of an incoming telephone call on the preexisting telephone lines, first switching means operative in response to the monitoring means to selectively interconnect the lead means and the incoming call detecting means when the predetermined limit is exceeded. Tone generator means are provided for producing an audible tone, as well as electrical simulating means for simulating lifting of a telephone receiver. Second switching means is operative in response to an incoming interrogating call to energize the simulating means to simulate the lifting of a telephone receiver at the called station and thereby cause the completion of the calling circuit and the energization of the tone generator means for producting an audible warning tone for the caller.

Figure 2:
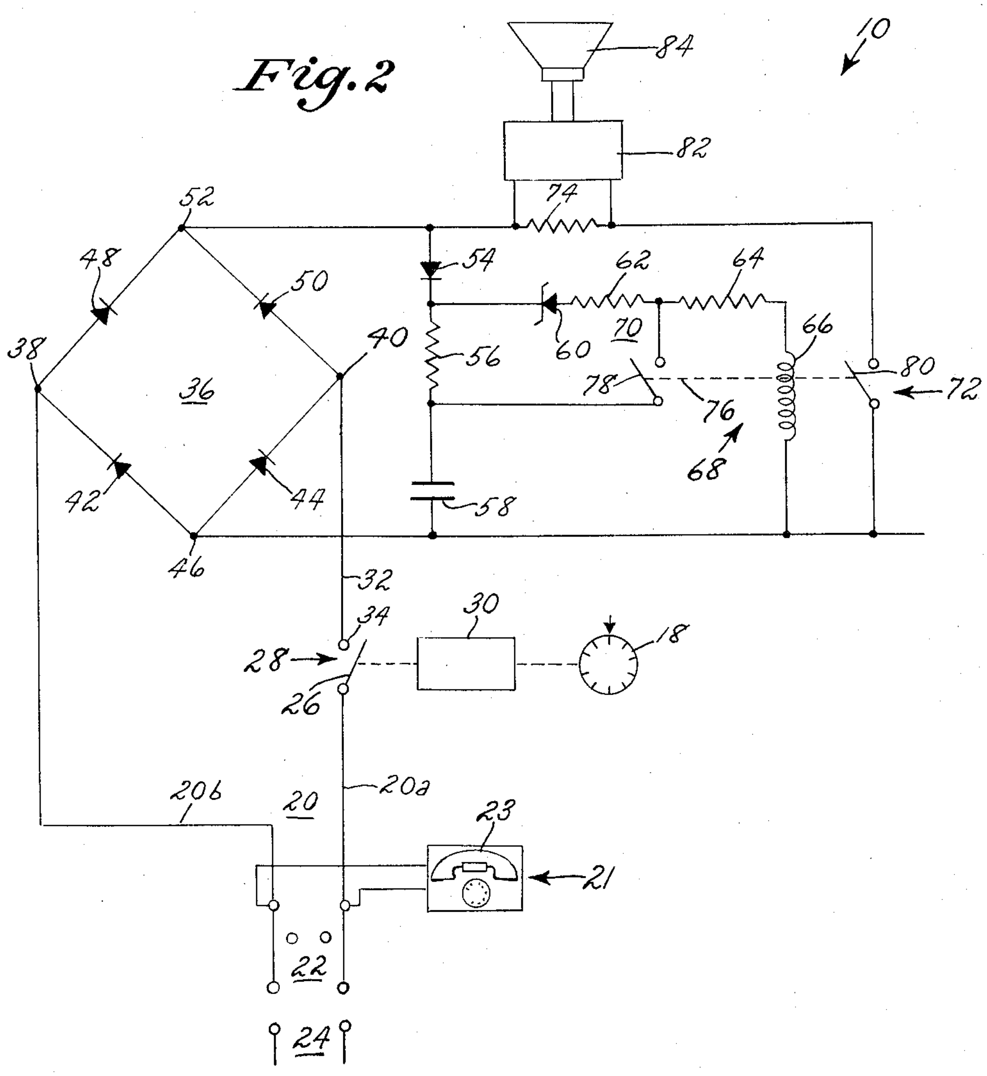

Additional objects and advantages of the present invention will become apparent during the course of the following specification when taken in connection with the accompanying drawings in which:

FIG. 1 is a prespective view of a preferred embodiment of the present invention, and FIG. 2 is an electrical schematic diagram of a preferred embodiment of the present invention.

FIG. 1 of the drawings illustrates in pictorial form one embodiment of a remote condition monitoring device 10 for monitoring the room temperature in a home and for providing an alarm signal to the telephone caller if the monitored room temperature falls below a preselected danger level indicating failure of the home heating system.

In FIG. 1, monitoring device 10 is enclosed in a box-like housing 12, mounted on four rubber-like legs 14 and includes a front-face panel 16 provided with a thermostat control dial 18 for setting the temperature warning level, a drop below which will be indicative of a failure in the home heating system. Extending from the rear of housing 12 is a two-wire line cord 20 which terminates in a telephone plug 22.

In operation, an extension jack is provided for each telephone station which is to receive an interrogating telephone call, into which plug 22 is inserted. Plug 22 is a "piggy-back" unit with a second extension jack built into its back for receiving the telephone extension plug from a telephone instrument 21, whereby telephone instrument 21 remains connected to the telephone lines and is operative in the usual manner, completely unaffected by the presence of device 10.

In FIG. 2, plug 22 is shown connected to the telephone line jack outlet 24 with telephone 21 and device 10 both connected to plug 22. Lead 20*a* of line cord 20 is connected to switch arm 26 of the thermostat switch 28 of thermostat 30. Lead 20*b* of line cord 20 and lead 32 which is connected at one end thereof to the stationary contact 34 of thermostat switch 28, are respectively connected to the opposite input terminals 38, 40 of full wave rectifier bridge 36.

Rectifier bridge 36 comprises a first pair of diodes 42, 44 connected with their anodes back-to-back at a first bridge output terminal 46 with their cathodes respectively connected to bridge input terminals 38 and 40, and a second pair of diodes 48, 50 connected with their cathodes back-to-back at a second bridge output terminal 52.

A charging circuit comprising the series arrangement of diode 54, charging resister 56 and charging capacitor 58 is connected across the bridge rectifier output terminals 46 and 52. A zener diode 60 has its cathode connected to the junction of resistor 56 and diode 54. Resistors 62 and 64 are connected in series with the anode of zener diode 60 and the electromagnetic coil 66 of relay 68 is connected between resistor 64 and bridge rectifier output terminal 46. Electromagnetic relay 68 is provided with a first normally-open switch 70 connected between the junction of resistors 62 and 64 and the junction of charging resistor 56 and charging capacitor 58, and a second normally-open switch 72 connected at one end to bridge rectifier output terminal 46 and at the other end through output resistor 74 which is connected at its other end to bridge rectifier output terminal 52. As shown by dotted line 76, contact arms 78 and 80 of switches 70 and 72 are poled in the same direction under the electromagnetic action of relay coil 66.

In operation, the telephone circuit to which plug 22 is connected, provides a DC telephone line voltage of about 50 volts across leads 20*a* and 20*b*. When the temperature being monitored falls below the level preset by thermostat dial 18, thermostat switch 28 closes thereby connecting leads 20*a* and 32, and applying a 50 volt DC voltage across bridge input terminals 38 and 40 to produce a DC voltage of about 50 volts DC (assuming negligible voltage drops across diodes 42, 44, 48 and 50) across bridge rectifier output terminals 46 and 52 which are respectively negative and positive in polarity. As a result, capacitor 58 will charge up to a level of about 50 volts, the charging current being limited by charging resistor 56.

When an incoming telephone call occurs, an AC ringing signal of about 100 volts is applied to telephone lines 20*a* and 20*b*. This AC ringing voltage is applied to bridge rectifier 36 to produce a full wave rectified AC waveform which is superimposed on the preexisting 50 volts DC voltage at bridge output terminals 46 and 52. Zener diode 60 is chosen to have a reverse flow threshold voltage which is slightly greater than the DC telephone line voltage. Thus, in the presence of only the DC telephone line voltage, zener diode 60 acts as an opened switch, but upon occurrence of the AC ringing signal, the rectified AC ringing signal which is superimposed on the DC telephone line voltage produces a total DC voltage at zener diode 60 which is greater than the reverse bias threshold thereof causing diode 60 to conduct in the reverse direction. As a result, current flows through zener diode 60, current limiting resistors 62 and 64 and through coil 66 thereby energizing coil 66 and causing switch contacts 78 and 80 to close.

The closing of switch contact 78 applies virtually the entire stored charge on capacitor 58 (except for a slight voltage drop across resistor 64) across coil 66 to thereby provide a holding circuit to keep switch contacts 78 and 80 in the closed position. This holding function will be operative to keep switch contacts 78 and 80 closed for a period of time determined by the RC time constant of charging capacitor 58, resistor 64 and the resistance of coil 66 and the ratio of the drop-out voltage of relay 68 to the initial holding voltage on charging capacitor 58.

As previously indicated, the energization of coil 66 closes switch contact 80, which causes current to flow through resistor 74 to produce a voltage thereacross. Resistor 74 is selected so that upon closure of switch contact 80, resistor 74 will draw current of a magnitude substantially equal to the current drawn by a telephone instrument when the receiver is lifted from the cradle.

From the foregoing, it is seen that the appearance of the AC ringing signal will produce a current drain which simulates the lifting of telephone receiver 23. The telephone central stration recognizes the foregoing current drain as the lifting of a receiver and in response thereto, removes the AC ringing signal voltage and by means of the central station switching equipment, completes the calling circuit between the caller's station and line cord 20.

The telephone central station switching equipment and connecting circuitry (not shown) introduce a large impedance (800–2,000 ohms) in series with resistor 74 via lines 20*a*, 32, 20*b* and bridge 36, whereby the voltage across resistor 74 drops to about 5 to 15 volts which serves to drive oscillator 82, which in turn drives an audio speaker 84 to emit an audio tone. The just-mentioned low voltage of about 5 to 15 volts, in addition to driving oscillator 82, serves to back-bias diode 54 thereby isolating the previously-described relay holding circuit from telephone lines 20*a*, 20*b* and oscillator 82.

Oscillator 82 acts as a cyclically-varying resistor in parallel with resistor 74 to produce the same effect on the telephone line current as an audio tone at the usual variable resistance carbon microphone on the telephone receiver, the resulting AC component of the DC telephone load current producing an audible tone at the calling station, thus simulating the answering of a telephone with an audible message as well as simulating lifting the receiver from the telephone instrument cradle. This AC component also acts to power the driver coil (not shown) of speaker 84 to produce an audible tone for testing purposes. This test tone serves to indicate that the monitoring device is responding to an interrogating call and provides a warning signal in the form of the audible test tone.

As indicated above, relay switches 70 and 72 will remain closed for a time period determined by the RC time constant of capacitor 58, resistor 64 and the resistance of relay coil 66, and the ratio of the relay drop-out voltage to the initial holding voltage. This holding period, which is made to be of about 6–10 seconds duration by the selection of the above-mentioned components determining the holding period, is sufficiently long to permit the preexisting telephone system to recognize the response to the incoming call, to activate the appropriate switching operations to complete the calling circuit, to produce an audible warning tone or cause the playback of a recorded message from a tape recorder and playback unit (not shown) at the calling station and to bill the caller for the completed call.

In the embodiment of the present invention just described, a distinctive warning tone is heard by the caller whenever the monitored condition is unsatisfactory. Thermostat 30, however, may be easily adjusted to close switch 28 when the monitored condition is normal and to open switch 28 when the monitored condition is unsatisfactory. With such an arrangement, the presence of the distinctive tone produced by oscillator 82 will signify a normal condition and the absence of such distinctive tone will signify the unsatisfactory condition. In the latter "fail-safe" arrange, any failure or malfunction of the monitoring device will result in the absence of the distinctive tone and will alert the caller to investigate.

In yet another embodiment of the present invention, the open or closed position of monitoring switch 28 can be used to indicate another form of monitored information, namely, the presence of either of two conditions, neither of which represents an unsatisfactory condition.

From the foregoing description of the various possible embodiments of the present invention, it is evident that the principles thereof are applicable to situations requiring a response to any remote inquiry which requires a yes/no answer. In addition to the above-described application for monitoring room temperature to prevent the freezing of water pipes, the principles of the present invention may be used to periodically monitor a multitude of other parameters such as pressure, light level, aperture opening, liquid levels, burglar alarm settings, noise levels, humidity or any other detectable condition or conditions which are adapted to produce the opening and closing of monitor switch 28.

It is clear that the remote condition monitoring device of the present invention is advantageous over the conventional automatic telephone answering devices which respond to the telephone ring signal by transmitting a recorded message, since such known devices, unlike the embodiments of the present invention, require an external power source and complex equipment for voice or data transmission. Such conventional answering devices, however, may be modified in accordance with the above-described principles of the present invention, to respond only upon occurrence of a warning condition, by the addition of a normally open switch, which corresponds to monitoring switch 28, in the power line or control line thereof, with this additional normally-open switch being controlled by the monitored condition.

While preferred embodiments of the invention have been shown and described herein, it is obvious that numerous omissions, changes and additions may be made in such embodiments without departing from the spirit and scope of the invention.

What is claimed is:

1. A remote-condition monitoring apparatus for use in conjunction with a preexisting telephone system comprising lead means including first and second leads adaptable for connection to preexisting telephone station lines, monitoring means operative to determine when a preselected measurable physical parameter exceeds a present limit, ring detector means for detecting the electrical ringing signal on said lead means representing the presence of an incoming telephone call on said preexisting telephone station lines to produce a ring detector signal in response to said ringing signal, first switching means operative in response to said monitoring means to selectively interconnect said lead means and said incoming call detecting means when said preset limit is exceeded, electrical simulating means operative to provide an electrical simulation signal equivalent to that produced at the central switching office of said preexisting telephone system by the lifting of a telephone receiver to thereby cause the completion of the calling circuit for said incoming telephone call by said central switching office, second switching means connected to the output of said ring detector means and operative in response to said ring detector signal to connect said electrical simulating means to the output of said lead means whereby said ringing signal is applied to said electrical simulating means to initiate said electrical simulation signal, and tone generator means connected to said electrical simulating means and operative in response thereto to produce an audible tone over said completed calling circuit.

2. A remote-condition monitoring apparatus according to claim 1 wherein said ring detector means comprises timing means connected to said second switching means for causing said second switching means to disconnect said electrical simulating means from said lead means output upon expiration of a preselected period of time from said connection thereto, thereby controlling the duration of said electrical simulation signal.

3. A remote-condition monitoring apparatus according to claim 2 wherein said first switching means is connected in series with said first lead of said lead means.

4. A remote-condition monitoring apparatus according to claim 3 wherein said lead means comprises a full-wave rectifier bridge having first and second input terminals, said bridge first input terminal being connected to said first switching means and said bridge second input terminal being connected in series with said second lead of said lead means.

5. A remote-condition monitoring apparatus according to claim 4 wherein said ring detector means includes a unilaterally-conductive device, a charging resistor and a charging capacitor in series arrangement connected across the output of said lead means.

6. A remote-condition monitoring apparatus according to claim 5 wherein said full-wave rectifier bridge comprises first and second output terminals connected respectively to the ends of the series arrangement of said unilaterally conductive device, said charging resistor and said charging capacitor.

7. A remote-condition monitoring apparatus according to claim 6 wherein said ring detector means further includes a zener diode connected at one end to the junction of said unilaterally-conductive device and said charging resistor and at its other end to said second switching means.

8. A remote-condition monitoring apparatus according to claim 7 wherein said electrical simulating means comprises a load resistor having one end thereof connected to the junction of said unilaterally-conductive device and said bridge rectifier first output terminal and the other end thereof to said second switching means.

9. A remote-condition monitoring apparatus according to claim 8 wherein said second switching means comprises first and second current limiting resistors serially connected to the other end of said zener diode, and a double-pole relay having a relay coil connected between said second current limiting resistor and said bridge rectifier second output terminal.

10. A remote-condition monitoring apparatus according to claim 9 wherein said timing means comprises said charging capacitor, said second current limiting resistor and said relay coil.

11. A remote-condition monitoring apparatus according to claim 10 wherein said double-pole relay comprises a first pair of switching contacts connected between the junction of said charging resistor and said charging capacitor and the junction of said first and second current limiting resistors respectively.

12. A remote-condition monitoring apparatus according to claim 11 wherein said double-pole relay includes a second pair of switching contacts connected between the other end of said load resistor and said bridge rectifier second output terminal.

13. A remote-condition monitoring apparatus according to claim 12 wherein said first and second pairs of said relay switching contacts are poled in the same direction.

14. A remote-condition monitoring apparatus according to claim 13 wherein said tone generator means comprises an oscillator having a pair of input terminals and a pair of output terminals, said oscillator input terminals being connected across said load resistor, and an audio speaker connected across said tone generator output terminals.

* * * * *